(No Model.)
A. K. DOE.
LOG AND RAFT COUPLING.
No. 309,825. Patented Dec. 30, 1884.
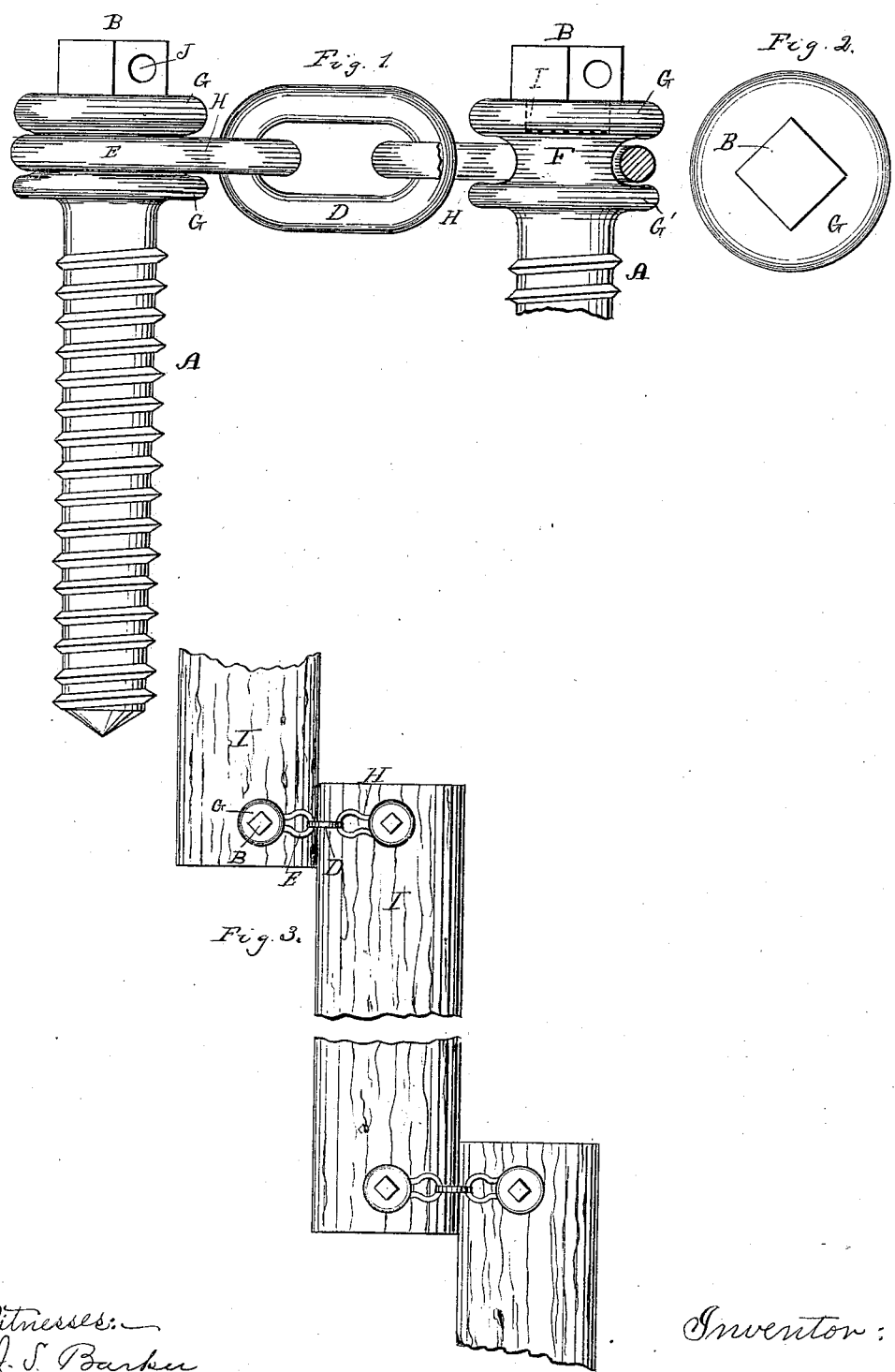

UNITED STATES PATENT OFFICE.

ALPHEUS KINGSLEY DOE, OF STILLWATER, MINNESOTA.

LOG AND RAFT COUPLING.

SPECIFICATION forming part of Letters Patent No. 309,825, dated December 30, 1884.

Application filed April 8, 1884. (No model.)

*To all whom it may concern:*

Be it known that I, ALPHEUS KINGSLEY DOE, of the city of Stillwater, county of Washington, State of Minnesota, have invented a new and Improved Boom, Log, and Raft Chain or Coupling, of which the following is a specification.

Figure 1 is a side view of a connecting device embodying my improvements. Fig. 2 is a top view of one of the screws or pins. Fig. 3 is a top view of a part of a boom the logs of which are connected by my device.

In the drawings, A represents the stem portion of one of the pins or screws, it being preferably formed with threads of any suitable pitch and number. At the upper end it is provided with means for holding one end of a chain properly in place, and also with means whereby it may be readily rotated, so as to force it into or withdraw it from a log.

The means shown for preventing the displacement therefrom vertically or longitudinally of the chain consist of two flanges or beads, G and G', these being preferably arranged, substantially as shown, so as to leave an annular cavity, F, between them. However, any equivalent devices may be substituted for these flanges which shall be adapted to accomplish the end attained by the form herein shown—that is, prevent the escape of the chain longitudinally in either direction from the pin or screw, and at the same time permit the rotation of the pin or screw independently of the chain.

I have indicated in the drawings three methods for rotating the screw for the purpose of driving it into or withdrawing it from its seat in the log. In full lines there are shown upwardly-extending squared projections B, which are adapted to fit the aperture in a wrench of the well-known form. Instead thereof, use may be made of sockets or recesses in the upper ends, angular in cross-section, as shown by dotted lines at I in Fig. 1, and into recesses of this nature wrenches having angular projections may be readily adapted to fit, as will be seen upon inspecting the drawings.

Another well-known device for effecting the rotating of a screw of a shaft may be employed, it being a transverse aperture or recess, as shown by full lines at J, Fig. 1, adapted to receive a rod or wrench, as will be readily understood.

D E represent the end link of the chain which connects together the threaded bolts or pins, this link being preferably shaped as shown, to have one portion, D, adapted to fit the aforesaid annular recess or cavity between the flanges or lateral projections G G', and another portion, E, adapted to engage with an adjacent link. When the end link is constructed in the form shown, the part D cannot, under ordinary circumstances, escape from the parts G G', and therefore, whether the screws are fastened in the log or not, the connecting device as a whole (including the two screws and the intermediate chain) can be transported or stored without danger of having any of its parts become detached from the others.

Heretofore use has been made of log-connecting devices of such nature that while in place upon the logs there was more or less security of their being held in place, but after being removed therefrom the parts could be readily detached from each other, and thus there was no guarantee of having all the parts of each connecting device so united that when one (part) was at hand the whole connection would be. Between the two end links I prefer to employ a single link to connect them, as shown at D', this engaging with the end portions, E D. Though I do not wish to be limited to exactly one link, as where the logs are large, or where it is required to unite two logs at some distance from each other, it will be necessary to have a longer chain between the two screws.

The method of using the device which I have described and shown will be readily understood. If it is to be employed in the construction of a boom, two logs are placed so that their ends lap one over the other the required distance. Holes of the proper size and depth are then bored, and the screws A are inserted and forced into place by means of a suitable wrench.

When constructing a raft, the method of using the device is substantially similar, except that under some circumstances a longer chain may be necessary.

After the connecting device has served its purpose in one case, the screws can be readily withdrawn, and it can be carried to another place or can be returned, (as in rafting.) By using this much of the labor now necessary in constructing the connecting devices, which are only temporarily used, can be avoided, and, moreover, it insures a much more secure and durable fastening device than those heretofore in use to my knowledge.

It will be seen that without departing from the spirit of my invention numerous modifications can be employed, and although I have described specifically one form in order that the invention may be clearly understood, yet I do not wish to be limited exactly thereto. Thus, some of the advantageous features can be preserved even if the pin or bolt be not threaded, and if the recess at F be sunk within the diameter of the stem or shank proper, in which latter case the walls of the recess would serve the purpose of the walls at G G', though where as much strength as possible is desirable I prefer to use the construction which I have shown.

What I claim is—

1. In a connecting device for uniting logs together, the combination, with a pin adapted to be inserted into a log and provided with two lateral projections or equivalents, of a link fitting loosely between the said lateral projections, and adapted, substantially as set forth, to be connected with another log, substantially as described.

2. In a connecting device for uniting logs together, the combination of the threaded screw or pin having its outwardly-projecting portion constructed substantially as set forth, to receive a wrench, and provided with an annular recess, in combination with a chain, one of the links of which fits loosely within said recess, whereby the chain is prevented from escaping from the threaded pin or bolt, substantially as described.

ALPHEUS KINGSLEY DOE.

Witnesses:
FRED W. RAUM,
DAVID CAMFEL.